US008977202B2

(12) United States Patent
Tanada

(10) Patent No.: US 8,977,202 B2
(45) Date of Patent: Mar. 10, 2015

(54) COMMUNICATION APPARATUS HAVING A UNIT TO DETERMINE WHETHER A PROFILE IS OPERATING

(75) Inventor: Tosaku Tanada, Tokyo (JP)

(73) Assignee: Fujitsu Moble Communications Limited, Kawasaki (JP)

( * ) Notice: Subject to any disclaimer, the term of this patent is extended or adjusted under 35 U.S.C. 154(b) by 776 days.

(21) Appl. No.: 12/111,525

(22) Filed: Apr. 29, 2008

(65) Prior Publication Data

US 2008/0299908 A1 Dec. 4, 2008

(30) Foreign Application Priority Data

May 29, 2007 (JP) ................................ P2007-142031

(51) Int. Cl.
*H04B 7/00* (2006.01)
*G08C 17/02* (2006.01)

(52) U.S. Cl.
CPC ...................................... *G08C 17/02* (2013.01)
USPC ......................................... 455/41.2; 455/41.3

(58) Field of Classification Search
CPC ............ H04M 1/7253; H04M 1/6066; H04M 1/6091; H04M 1/6075; H04M 1/6083; G08C 17/02
USPC ........... 455/575.2, 550.1, 41.2, 420; 704/500; 700/94
See application file for complete search history.

(56) References Cited

U.S. PATENT DOCUMENTS 7,149,475 B2 * 12/2006 Kawamura ................... 455/41.2
7,155,681 B2 * 12/2006 Mansour et al. .............. 715/762
7,249,147 B2 * 7/2007 Juszkiewicz ............... 369/30.06
7,356,334 B2 * 4/2008 Yamashita ..................... 455/420
7,693,989 B2 * 4/2010 Aoki et al. ..................... 709/225
7,774,027 B2 * 8/2010 Parikh et al. .................. 455/557
2002/0041602 A1 * 4/2002 Kageyama et al. ........... 370/426
2005/0286466 A1 * 12/2005 Tagg et al. .................... 370/329
2007/0005368 A1 * 1/2007 Chutorash et al. ............ 704/275

(Continued)

FOREIGN PATENT DOCUMENTS

JP 2006-094448 A 4/2006
JP 2006-121624 A 5/2006
JP 2006303584 A * 11/2006

OTHER PUBLICATIONS

Japanese Office Action dated Apr. 14, 2009 (2 pages), issued in counterpart Japanese Application No. 2007-142031.

*Primary Examiner* — Yuwen Pan
*Assistant Examiner* — Fatuma Sherif
(74) *Attorney, Agent, or Firm* — Maschoff Brennan

(57) ABSTRACT

To enable an appropriate steaming transfer of audio data in an environment where a plurality of profiles can be operated. In a communication terminal according to an embodiment of the present invention, a short distance wireless communication unit receives a remote controller command transmitted from a head set which is connected with a short distance wireless communication, via the wireless communication. An operation profile determination unit refers to a use status of each profile previously managed by a Bluetooth profile use status management unit when the remote controller command is received and determines whether a predetermined profile used upon the wireless communication is operated. When it is determined that the predetermined profile is operated, a remote controller control unit performs a control such that a response corresponding to the remote controller command is transmitted to the opposite device and the remote controller command is discarded.

11 Claims, 6 Drawing Sheets

(56) References Cited

U.S. PATENT DOCUMENTS

2007/0098004 A1* 5/2007 Lada .............................. 370/437
2007/0135047 A1* 6/2007 Lee .............................. 455/41.2
2007/0140187 A1* 6/2007 Rokusek et al. .............. 370/338
2007/0150822 A1* 6/2007 Mansour et al. .............. 715/762
2007/0247449 A1* 10/2007 Mack et al. ................... 345/204
2009/0015433 A1* 1/2009 James et al. ............. 340/825.69

* cited by examiner

CASE OF ACCEPTING Play COMMAND OF AVRCP AND THEREAFTER DISCARDING COMMAND

COMMUNICATION APPARATUS HAVING A UNIT TO DETERMINE WHETHER A PROFILE IS OPERATING

BACKGROUND OF THE INVENTION

1. Field of the Invention

The present invention relates to a communication terminal. In particular, the invention relates to a communication terminal in which a media player can be controlled with a remote controller of an opposite device.

2. Description of the Related Art

In recent years, mobile telephone devices have been mounted not only with a communication function simply based on telephone calls, an address book function, a mail function via a network such as base stations or the Internet, and a browser function with which a Web page and the like can be viewed, but also with multimedia functions such as a music control function for enabling listening of audio data and functions for enabling reception of digital terrestrial broadcasting airwaves, digital terrestrial radio airwaves, and FM radio airwaves.

The Bluetooth (registered trademark), for example, has been known as a wireless communication technology applicable to electronic equipment. The use of the Bluetooth as a wireless communication technology may allow the transmission of audio data from a mobile information terminal such as a mobile telephone device or a mobile music player to an opposite device such as a head set or an in-vehicle device, without via an audio cable.

As a profile for transmitting the audio data, for example, "Advanced Audio Distribution Profile (A2DP)", "Generic Audio/Video Distribution Profile", etc., have been known. These technologies are standards for stream-transferring the audio data in real time between/among devices connected via the Bluetooth.

For example, in the mobile information terminal such as the mobile telephone device or the mobile music player, the audio data may be compressed by a format such as SBC (Sub Band Coding), MP3 (MPEG1 Audio Layer-3), or ATRAC (Advanced Transform Acoustic Coding) 3 and be transferred in packets. On the other hand, the opposite device such as a speaker and the head set simultaneously receives and reproduces data without waiting until the receipt of all packets. With this configuration, a user can hear the sound substantially in real time from the mobile information terminal, the mobile music player, or the like through the opposite device such as the speaker or the head set.

Recently, as a technology for reproducing audio data (data in an audio file format) by using the Bluetooth, such a technology has been known that an operation is performed on a mobile telephone device so that an arbitrary file can be identified and reproduced from among a plurality of audio files which are recorded in a music reproduction apparatus (for example, refer to Japanese Unexamined Patent Application Publication No. 2006-94448).

Also, for example, such a technology related to an AV remote controller service has been proposed that in a case where the audio data is transferred by using the Bluetooth from the mobile telephone device to the opposite device such as the head set or the in-vehicle device, a command is transmitted to the mobile telephone device with a remote controller previously provided to the opposite device to control the transfer, reproduction, stop, etc., of the audio data. The specification of this technology related to the AV remote controller service is defined by the standard of "AVRCP (Audio/video Remote Control Profile)".

The AVRCP defines a packet format for the AV remote controller command, but does not defines an interpretation, an operation method, or the like of the remote controller command. For that reason, the technologies related to the AV remote control service rely on mounting of the mobile telephone device or the like.

Furthermore, as a profile of a call control upon incoming and outgoing calls, for example, "Hands Free Profile" or the like is known. This profile is for performing a call control processing (a series of processing from connection request, calling, answering, conversation, and disconnection) upon incoming and outgoing telephone calls between the mobile telephone device and the opposite device which can wirelessly communicate with (for example, the head set or the in-vehicle device), enabling a telephone call in a hands-free state from the opposite device.

However, in a situation where a request of a remote controller command based on the AVRCP is accepted while the profile is operated in which the Bluetooth traffic is busy, for example, during data communication by using DUN (Dial-up Networking Profile) or during audio conversation by using the HFP, if a streaming operation based on the A2DP is started, not much bandwidth is available. Thus, the steaming transfer of the audio data cannot be performed at an appropriate timing, and as a result, there is a problem that generation of sound skipping or the like is caused.

SUMMARY OF THE INVENTION

Accordingly, the present invention has been made in view of the above-mentioned circumstances, and it is an object of the invention to provide a communication terminal in which a steaming transfer of audio data can be appropriately performed in an environment where a plurality of profiles can be operated.

In order to solve the above-mentioned problem, according to an aspect of the present invention, there is provided a communication terminal capable of communicating an electronic device via a short distance wireless communication, including: a reception unit configured to receive a remote controller command transmitted from the electronic device; a determination unit configured to determine whether a predetermined profile used upon the short distance wireless communication is operated or not based on a use status of each profile managed in advance when the remote controller command is received by the reception unit; and a control unit configured to control so as to transmit, in a case where it is determined by the determination unit that the predetermined profile is operated, a response corresponding to the remote controller command to the electronic device and to discard the remote controller command.

With the communication terminal according to the embodiment of the present invention, it is possible to perform the steaming transfer of the audio data appropriately in the environment where a plurality of profiles can be operated.

DESCRIPTION OF THE PREFERRED EMBODIMENTS

Figure 1:
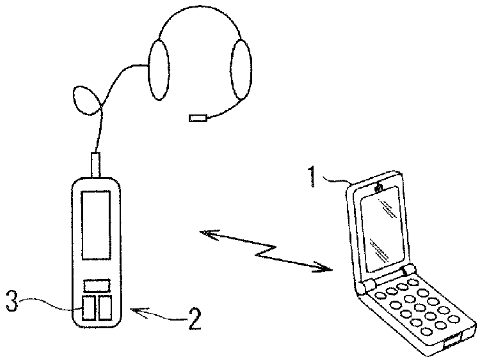
FIG. 1 is a schematic configuration diagram of an information exchange system according to an embodiment of the present invention.

Hereinafter, embodiments of the present invention will be described with reference to the drawings. FIG. 1 illustrates an information exchange system according to an embodiment of the present invention. As illustrated in FIG. 1, in a vicinity of a communication terminal 1, a head set 2 which can be applied as an opposite device according to the embodiment of the present invention is arranged. The head set 2 receives audio data transferred from the communication terminal 1 by using a wireless communication (for example, the Bluetooth or the like) and can reproduce the audio data in real time. It should be noted that the head set 2 is provided with a remote controller 3 which can remotely operate the communication terminal 1 via the wireless communication. In addition, as the opposite device, an in-vehicle device or the like may be used other than the head set 2.

Figure 2:
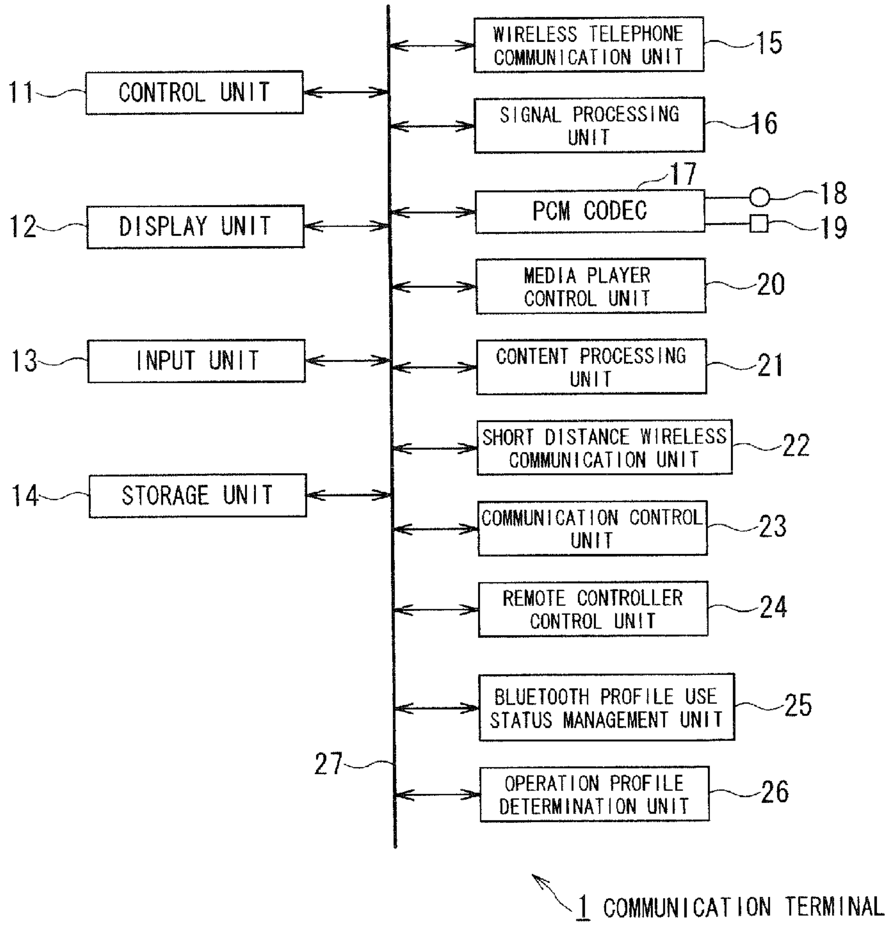
FIG. 2 is a block diagram of an inner configuration of a communication terminal according to an embodiment of the present invention.

FIG. 2 illustrates an inner configuration of the communication terminal 1 of FIG. 1. As illustrated in FIG. 2, the communication terminal 1 is configured of a control unit 11, a display unit 12, an input unit 13, a storage unit 14, a wireless telephone communication unit 15, a signal processing unit 16, a PCM codec 17, a microphone 18, a speaker 19, a media player control unit 20, a content processing unit 21, a short distance wireless communication unit 22, a communication control unit 23, a remote controller control unit 24, a Bluetooth profile use status management unit 25, and an operation profile determination unit 26, which are mutually connected via a bus 27.

The control unit 11 is configured of a CPU (Central Processing unit), a ROM (Read Only Memory), a RAM (Random Access Memory), and the like. The CPU performs various processing in accordance with a program stored in the ROM or various application programs loaded from the storage unit 14 onto the RAM. Also, the CPU generates various control signals to be supplied to the respective unit, thus controlling the communication terminal 1 in an overall manner. The RAM appropriately stores data which is necessary for the CPU to execute various processing and the like.

The display unit 12 is configured, for example, of a LCD (Liquid Crystal Display) and the like. The input unit 13 is configured of an operation key, an operation button, and the like, which are not shown.

The wireless telephone communication unit 15 receives a wireless signal transmitted from a base station (not shown) via an antenna which is not shown and calculates an intermediate frequency signal by performing down convert of the received wireless signal. Furthermore, the wireless telephone communication unit 15 performs a quadrature demodulation processing, back diffusion synthesis processing for each path with a RAKE receiver (not shown), and the like. After that, reception packet data output from the RAKE receiver is input to the signal processing unit 16.

The signal processing unit 16 is configured, for example, or a DSP (Digital Signal Processor) and the like. The signal processing unit 16 separates the reception packet data for each media and performs a decoding processing on the separated data for each media.

The signal processing unit 16 decodes, for example, in a case where audio data is included in the reception packet data, thus audio data with a speech codec. In addition, the signal processing unit 16 decodes, in a case where moving picture data is included in the reception packet data, thus moving picture data with a video codec. Furthermore, in a case where the reception packet data is a download content, the signal processing unit 16 expands this download content.

A digital audio signal obtained through the decoding processing is PCM-decoded by the PCM codec 17, and thereafter amplified to be output by the speaker 19. On the other hand, a digital moving picture signal decoded by the video codec is supplied to the display unit 12 via the bus 27 to be displayed.

The media player control unit 20 controls, for example, a music player having a music control function. Notably, the communication terminal 1 may be provided with a terrestrial digital one-segment broadcasting/radio reception unit or the like for controlling, for example, various media players such as a terrestrial digital one-segment broadcasting player realized by executing an application program when terrestrial digital one-segment broadcasting airwaves are received.

The content processing unit 21 decodes the audio data encoded in an encoding format such as, for example, ACC, aacPlus, MP3, ATRAC, or SBC in a decoding format corresponding to the encoding format once, for example, when the music player is controlled by the media player control unit 20, and thereafter performs a re-encoding processing on the audio data in another encoding format.

The short distance wireless communication unit 22 is configured of, for example, a module which performs a wireless communication based on Bluetooth (registered trademark). The short distance wireless communication unit 22 performs the wireless communication with the head set 2 or the like existing in the vicinity of the communication terminal 1. It should be noted that wireless communications other than Bluetooth (for example, an infrared communication) may also be used.

The communication control unit 23 controls a communication performed with, for example, the head set 2 in an overall manner via the short distance wireless communication unit 22. For example, the communication based on the short distance wireless communication unit 22 in accordance with various profiles is controlled in an overall manner by using OBEX software or the like. For example, in the communication control unit 23, media packets in accordance with various media players controlled by the media player control unit 20 and the encoding format for the data are generated, and the thus generated media packets are sequentially transmitted to the head set 2 via the short distance wireless communication unit 22.

When the remote controller control unit 24 receives various remote controller commands from the remote controller 3 provided to the head set 2 via the short distance wireless communication unit 22, the remote controller control unit 24 interprets the received various remote controller commands in an interpretation method in accordance with each media player. When the media player is a music player, at the time of reproduction of the media player, such an interpretation is carried out as to whether the remote controller command received from the head set 2 functioning as the opposite device is which type of the various remote controller commands including, for example, “play”, “pause”, “stop”, “fast-forward”, “rewind”, “forward”, and “backward”. At this time, in accordance with this interpretation result, the remote controller control unit 24 appropriately notifies the media player control unit 20 of a start or an end of a change instruction for a reproduction status of the media player represented by the received remote controller command, etc. In addition, the remote controller control unit 24 causes a response command generated in accordance with this interpretation result to be transmitted via the short distance wireless communication unit 22 to the head set 2.

The Bluetooth profile use status management unit 25 manages use statuses of the various Bluetooth profiles used in the communication control unit 23.

The operation profile determination unit 26 determines whether or not the currently operating profile is which one of the various Bluetooth profiles managed by the Bluetooth profile use status management unit 25.

Figure 3:
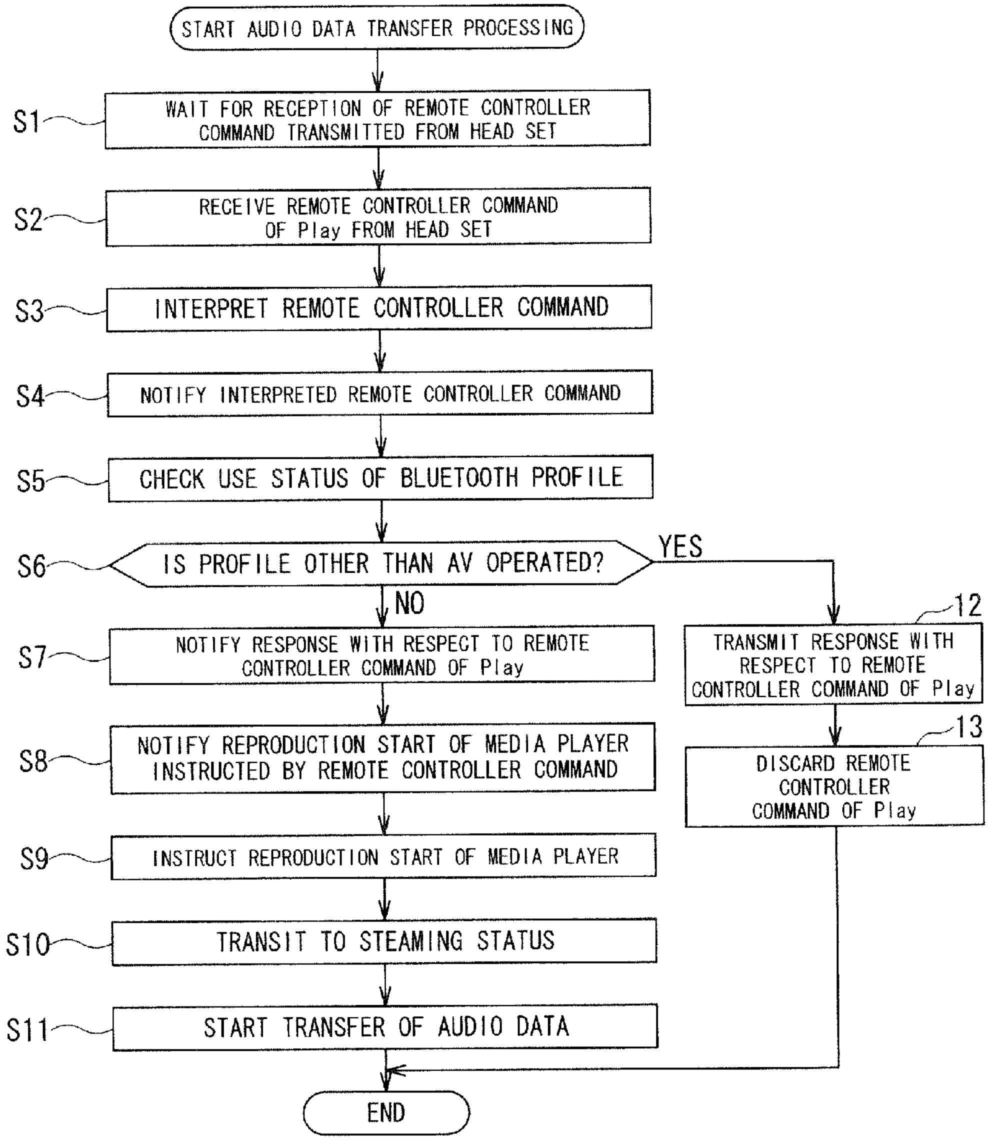
FIG. 3 is a flowchart for describing an audio data transfer processing in the communication terminal of FIG. 2.

Next, with reference to a flowchart of FIG. 3, the audio data transfer processing in the communication terminal 1 of FIG. 2 will be described. This audio data transfer processing is started, during multi-connections based on a plurality of profiles such as the DUN, the HFP, and the AVRCP between the communication terminal 1 and the head set 2 via the short distance wireless communication unit 22, when a remote controller command (for example, a “Play” command or the like) is received from the head set 2. It should be noted that FIGS. 4 and 5 illustrate specific processing sequences between the communication terminal 1 and the head set 2 when the audio data transfer processing is described with reference to the flowchart of FIG. 3.

In step S1, the short distance wireless communication unit 22 waits for a reception of a remote controller command transmitted from the head set 2 functioning as the opposite device (for example, a “Play” command or the like). In Step S2, the short distance wireless communication unit 22 receives the remote controller command of “Play” transmitted from the head set 2 functioning as the opposite device, and supplies the received remote command of “Play” (PASS THROUGH request (type=Play)) via the communication control unit 23 to the remote controller control unit 24 (step S21 of FIG. 4 or step S31 of FIG. 5).

In step S3, the remote controller control unit 24 interprets (analyzes) the received remote controller command through an interpretation method in accordance with each media player. In a case where the media player is a music player, during the reproduction of the media player or the like, an interpretation is made as to whether the remote controller command received from the head set 2 functioning as the opposite device is, for example, any one of various remote controller commands such as “play”, “pause”, “stop”, “fast-forward”, “rewind”, “forward”, and “backward”. In this case, the received remote controller command is the remote controller command of “Play”, and the remote controller command received from the head set 2 functioning as the opposite device is interpreted as the remote controller command of “Play”.

Figure 4:
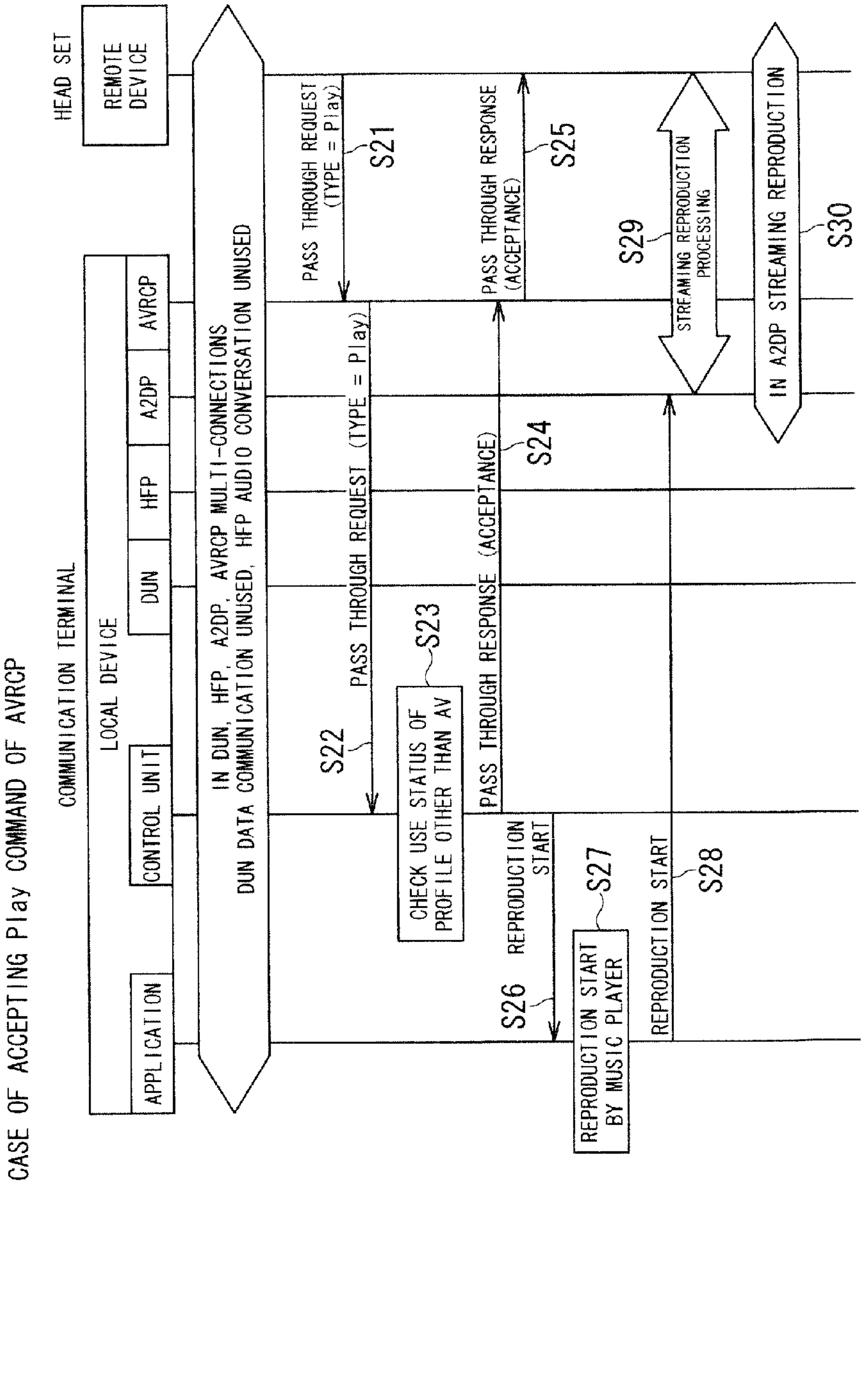
FIG. 4 illustrates a sequence of a specific processing performed between the communication terminal and a head set when the audio data transfer processing which is described with reference to the flowchart of FIG. 3 is executed.
Figure 5:
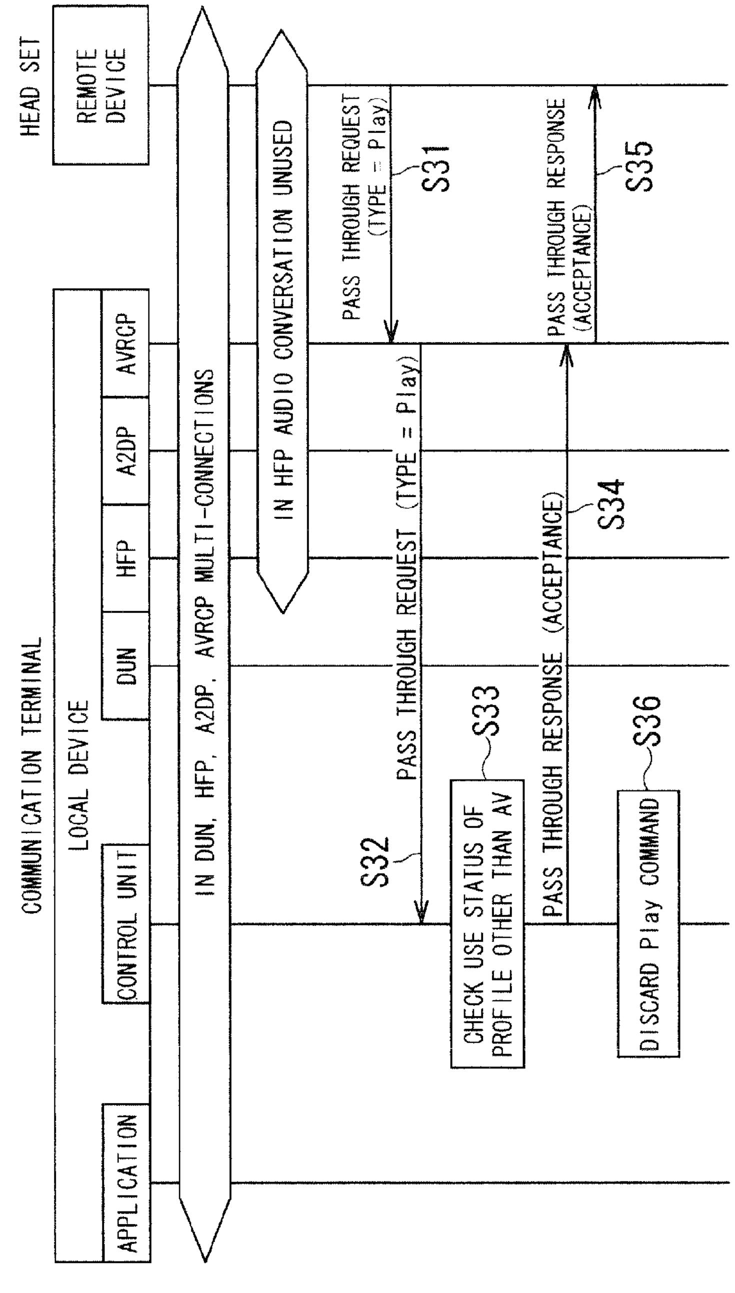
FIG. 5 illustrates another sequence of the specific processing performed between the communication terminal and the head set when the audio data transfer processing which is described with reference to the flowchart of FIG. 3 is executed.

In step S4, the remote controller control unit 24 supplies the interpreted remote controller command (the remote controller command of “Play” (PASS THROUGH request (type=Play))) to the operation profile determination unit 26 (step S2 of FIG. 4 or step S32 of FIG. 5). In Step S5, when the operation profile determination unit 26 obtains the remote controller command (the remote controller command of “Play” (PASS THROUGH request (type=Play))) from the remote controller control unit 24, the operation profile determination unit 26 refers to the use status of various Bluetooth profiles managed by the Bluetooth profile use status management unit 25 and used in the communication control unit 23 to determine whether or not a profile other than AV is currently operated (for example, the profile such as the DUN or the HFP) (step S23 of FIG. 4 or step S33 of FIG. 5). In other words, the operation profile determination unit 26 checks whether a service (profile) in which the data communication amount is large is operated for the determination.

In step S6, when it is determined by the operation profile determination unit 26 that a profile other than the AV is not currently operated (for example, the profile such as the DUN or the HFP), the operation profile determination unit 26 supplies the determination result to the remote controller control unit 24. In Step S7, the remote controller control unit 24 recognized, on the basis of the determination result supplied from the operation profile determination unit 26, that a profile other than the AV is not currently operated (for example, the profile such as the DUN or the HFP) and also accepts the remote controller command of “Play” (PASS THROUGH request (type=Play)) transmitted from the head set 2 to transmit a response with respect to this remote controller command of “Play” (PASS THROUGH request (type=Play)) (PASS THROUGH response (acceptance)) via the short distance wireless communication unit 22 to the head set 2 (steps S24 to S25 of FIG. 4).

In step S8, the remote controller control unit 24 notifies the music player function as a higher layer application controlled by the media player control unit 20 of the reproduction start of the media player (for example, the music player) which is instructed by the accepted remote controller command of “Play” (PASS THROUGH request (type=Play)) (step S26 of FIG. 4).

In step S9, when the media player control unit 20 receives the notification of the reproduction start of the media player which is instructed by the remote controller command of “Play” (PASS THROUGH request (type=Play)) from the remote controller control unit 24, the media player control unit 20 controls the media player (for example, the music player) and reads out the audio data previously stored in the storage unit 14 to start the reproduction by the media player (for example, the music player) (step S27 of FIG. 4) and instructs the communication control unit 23 to execute the reproduction start by the media player (for example, the music player) (step S28 of FIG. 4).

In step S10, when the communication control unit 23 receives the instruction of the reproduction start by the media player (for example, the music player) from the media player control unit 20, the communication control unit 23 executes a data transfer procedure based on the A2DP to perform an initial setting of parameters used for transferring the audio data to the head set 2 and also establishes a transport logic channel for transmitting packets (media packets) between the communication terminal 1 and the head set 2. After that, through the data transfer procedure performed in the communication control unit 23, a status between the communication terminal 1 and the head set 2 is transited to a streaming status (step S29 of FIG. 4).

In step S11, the communication control unit 23 starts the transfer processing of the audio data. To be more specific, after the transport logic channel is established, the communication control unit 23 extracts the audio data in frames suitable to codec formats (codec systems), and generates packets to be transferred to the head set on the basis of the audio data in frames extracted. The communication control unit 23 then sequentially buffers (temporarily stores) the thus generated packets in a buffer which is not shown, and also sequentially reads out the packets buffered in the buffer which is not shown. The communication control unit 23 sequentially transmits the read out packets by a predetermined amount each at a predetermined timing through a wireless communication to the head set 2 (step S30 of FIG. 4).

On the other hand, in step S6, when it is determined by the operation profile determination unit 26 that a profile other than the AV is currently operated (for example, the profile such as the DUN or the HFP) (in the case of FIG. 5, it is determined by the operation profile determination unit 26 that the HFP is operated and the HFP audio conversation is in action), the operation profile determination unit 26 supplies the determination result to the remote controller control unit 24. In Step S12, the remote controller control unit 24 recognizes, on the basis of the determination result supplied from the operation profile determination unit 26, that a profile other than the AV is currently operated (for example, the profile such as the DUN or the HFP) and also accepts the remote controller command of "Play" (PASS THROUGH request (type=Play)) transmitted from the head set 2 to transmit a response with respect to this remote controller command of "Play" (PASS THROUGH request (type=Play)) (PASS THROUGH response (acceptance)) via the short distance wireless communication unit 22 to the head set 2 (steps S34 to S35 of FIG. 5).

In step S13, the remote controller control unit 24 discards the accepted remote controller command of "Play" (PASS THROUGH request (type=Play)) (step S36 of FIG. 5).

According to the embodiment of the present invention, when the remote controller command (for example, the remote controller command of "Play") is received from the head set 2, the references are made on the use status of various Bluetooth profiles managed used in the communication control unit 23 to check whether a profile other than the AV is currently operated (for example, the profile such as the DUN or the HFP) for the determination (in other words, it is checked whether a service (profile) in which the data communication amount is large is operated for the determination). When it is determined that a profile other than the AV is currently operated (for example, the profile such as the DUN or the HFP), the received remote controller command (for example, the remote controller command of "Play") is accepted to transmit the response with respect to the remote controller command (for example, the remote controller command of "Play") to the head set 2, and it is possible to discard the remote controller command (for example, the remote controller command of "Play"). On the other hand, it is determined that a profile other than the AV is currently not operated (for example, the profile such as the DUN or the HFP), the streaming reproduction processing is performed, and it is possible to start the streaming transfer processing of the audio data based on the A2DP.

With this configuration, in a case where a request of the remote controller command based on the AVRCP is accepted while the profile in which the Bluetooth traffic is busy, for example, during the data communication using the DUN or during the speech telephone call using the HFP, while the streaming operation based on the A2DP is not to be started, it is possible to prevent generation of sound skipping along the streaming transfer of the audio data. That is, the streaming operation based on the A2DP can be performed in a normal status. Therefore, in an environment where a plurality of profiles can be operated, the steaming transfer of the audio data can be appropriately performed.

Figure 6:
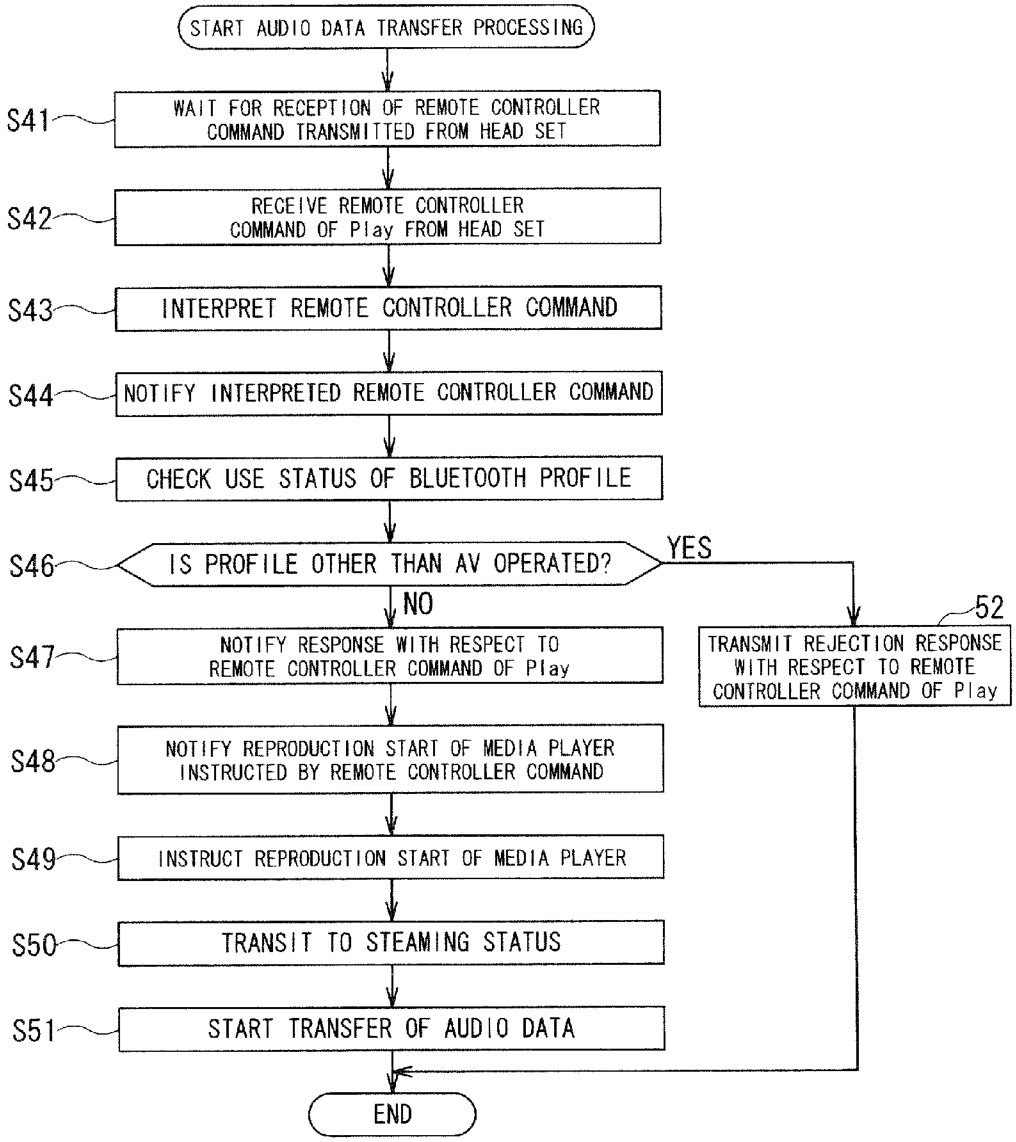
FIG. 6 is a flowchart for describing another audio data transfer processing in the communication terminal of FIG. 2.
Figure 7:
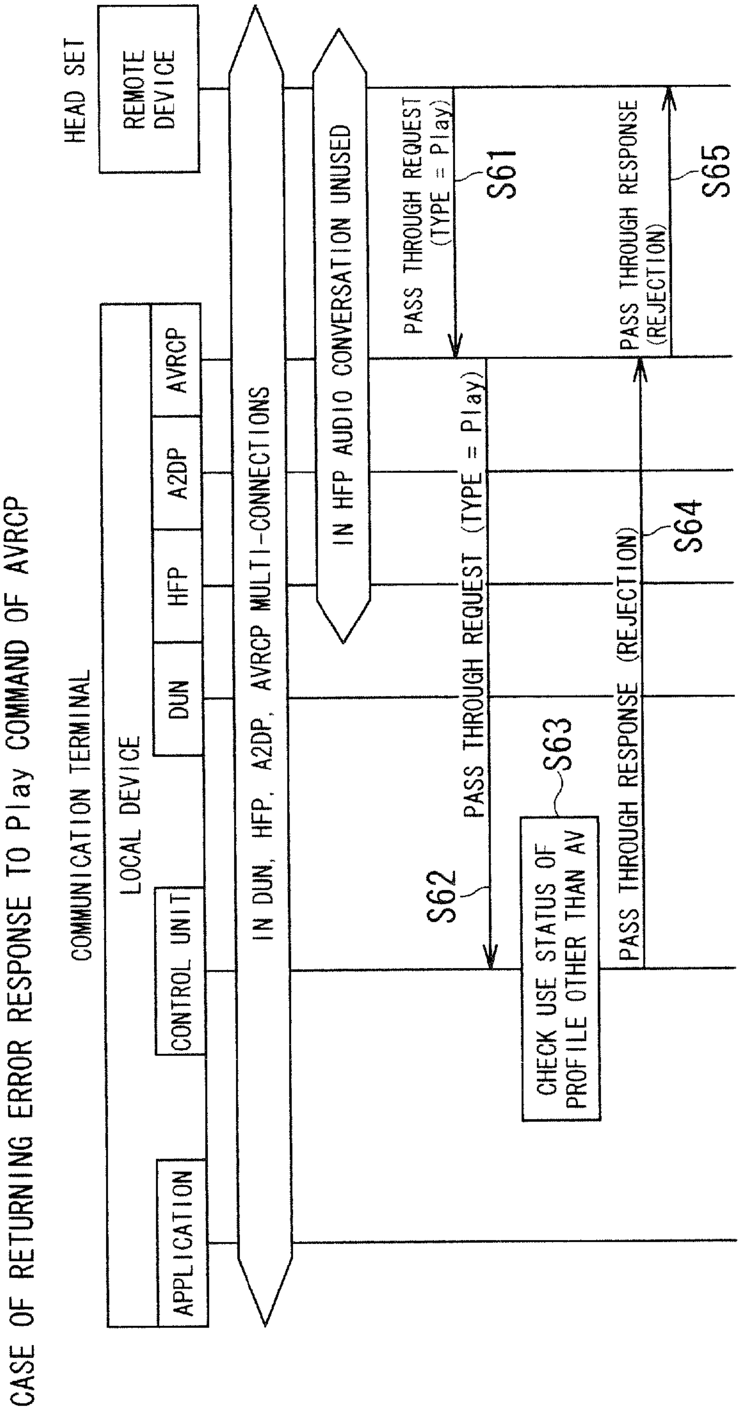
FIG. 7 illustrates a sequence of a specific processing performed between the communication terminal and a head set when the audio data transfer processing which is described with reference to the flowchart of FIG. 6 is executed.

It should be noted that as illustrated in a flowchart of FIG. 6, it is determined that a profile other than the AV is currently operated (for example, the profile such as the DUN or the HFP), in step S52, the remote controller control unit 24 may not accept the received remote controller command (for example, the remote controller command of "Play") and transmit a rejection response with respect to the remote controller command (for example, the remote controller command of "Play") to the head set 2 (steps S64 and S65 of FIG. 7). With this configuration, as a profile other than the AV is currently operated (for example, the profile such as the DUN or the HFP), it is possible to notify the head set 2 that the streaming operation based on the A2DP cannot be started. Therefore, in a case where a request of the remote controller command based on the AVRCP is accepted while the profile in which the Bluetooth traffic is busy, for example, during the data communication using the DUN or during the speech telephone call using the HFP, while the streaming operation based or the A2DP is not to be started, it is possible to prevent generation of sound skipping along the streaming transfer of the audio data. That is, the streaming operation based on the A2DP can be performed in a normal status. As a result, in an environment where a plurality of profiles can be operated, the steaming transfer of the audio data can be appropriately performed.

It should be noted that FIG. 7 illustrates a specific processing sequence between the communication terminal 1 and the head set 2 when the audio data transfer processing described with reference to the flowchart of FIG. 6 is executed.

Notably, when it is determined that a profile other than the AV is currently operated (for example, the profile such as the DUN or the HFP), the received remote controller command (for example, the remote controller command of "Play") may not be accepted and while a rejection response with respect to the remote controller command (for example, the remote controller command of "Play") is transmitted to the head set 2, the remote controller command (for example, the remote controller command of "Play") may be discarded. In addition, when it is determined that a profile other than the AV is currently operated (for example, the profile such as the DUN or the HFP), the following configuration may be adopted. That is, a response of a command mentioning that the request is temporarily accepted is made for the head set 2 with respect to the received remote controller command (for example, the remote controller command of "Play") (PASS THROUGH response (acceptance)), and also the request is not discarded but is held. After that, a stop of the operation by the profile other than the AV (for example, the profile such as the DUN or the HFP) is waited for, and the held response with respect to the remote controller command (for example, the remote controller command of "Play") is transmitted to the head set 2, and the streaming operation based on the A2DP may be started.

Furthermore, without accepting the received remote controller command (for example, the remote controller command of "Play"), after a rejection response with respect to the remote controller command (for example, the remote controller command of "Play") is transmitted to the head set 2, when the remote controller command (for example, the remote controller command of "Play") is further received from the head set 2, a similar processing may be repeatedly performed. In addition, the present invention may use, for example, other than the remote controller command of "Play", different remote controller commands (for example, the remote controller commands of "fastforward", "rewind", "forward", and "backward").

It should be noted that according to the embodiment of the present invention, as the communication terminal 1, for example, a PDA (Personal Digital Assistant), a personal computer, a mobile game machine, a mobile music player, a mobile video player, and the like can be applied.

Also, the series of processing described according to the embodiment of the present invention can be executed by using software but also can be executed by using hardware.

Furthermore, according to the embodiment of the present invention, the processing example in which the steps in the flowchart are processed in a time series manner in the described order, but the steps are not necessarily processed in the time series manner, and an embodiment of the present invention includes the processing in which the steps are processed in a parallel manner or are individually executed.

What is claimed is:

1. A communication terminal capable of communicating with an electronic device via a short distance wireless communication, comprising:

- a reception unit configured to receive a remote controller command transmitted from the electronic device and related to a first profile;
- a determination unit configured to determine whether a second profile used upon the short distance wireless communication is operated or not based on a use status of each profile managed in advance when the remote controller command is received by the reception unit, the second profile being different from the first profile; and
- a control unit configured, in a case in which the determination unit determines that the second profile is operated:
  - to transmit a response corresponding to the remote controller command and indicating temporary acceptance of the remote controller command to the electronic device,
  - to hold the remote controller command until the second profile stops operating and
  - to start operating the first profile according to the held remote controller command after the second profile stops operating, and to discard the held controller command after the second profile stops operating, and to discard the held remote controller command after sending a response corresponding to the held remote controller command to the electronic device.

2. The communication terminal according to claim 1, wherein in the case where it is determined by the determination unit that the second profile is operated, the control unit is further configured to transmit an acceptance response corresponding to the remote controller command to the electronic device after the second profile stops operating.

3. The communication terminal according to claim 1, wherein in a case where it is determined by the determination unit that the second profile is not operated, the control unit is configured to accept the remote controller command, start a transfer processing of audio data, and start the operation of the first profile.

4. The communication terminal according to claim 1, wherein the remote controller command includes at least a command for instructing a reproduction of the media player.

5. The communication terminal according to claim 1, wherein the second profile used upon the wireless communication includes at least a Dial-up Networking profile (DUN) and a Hands Free Profile (HFP).

6. The communication terminal according to claim 1, wherein the first profile is an Advanced Audio Distribution Profile (A2DP).

7. The communication terminal according to claim 6, wherein starting the operation of the first profile comprises starting a streaming operation based on the A2DP.

8. The communication terminal according to claim 1, wherein holding the remote controller command until the second profile stops operating avoids the generation of sound skipping in the electronic device.

9. The communication terminal according to claim 1, wherein the remote controller command comprises a play command.

10. The communication terminal according to claim 1, wherein the remote controller command comprises one of a fast forward command, a rewind command, a forward command, and a backward command.

11. A communication terminal comprising: a reception unit configured, in a case in which a plurality of profiles including a first profile and a second profile are multi-connected between the communication terminal and an electronic device, to receive a remote controller command that is related to the first profile and is transmitted from the electronic device via a short distance wireless communication;

- a determination unit configured, in a case in which the reception unit receives the remote controller command that is related to the first profile, to determine whether the second profile is operated based on a use status of each of the plurality of profiles managed in advance;
- a control unit configured, in a case in which the determination unit determines that the second profile is operated, to transmit an acceptance response or a rejection response corresponding to the remote controller command that is related to the first profile to the electronic device, and to discard the remote controller command, and in a case in which the remote controller command is not discarded, to accept the remote controller command, to hold the remote controller command until the second profile stops operating, and to start operating the first profile according to the held remote controller command after the second profile stops operating.

* * * * *